C. L. BETTS.
LAMP.
APPLICATION FILED JAN. 21, 1910.
1,041,414.
Patented Oct. 15, 1912.
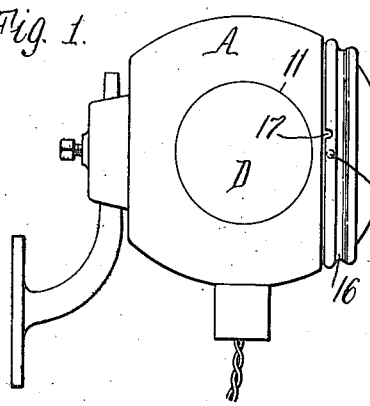
Fig. 1.
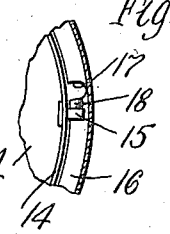
Fig. 7.
Fig. 8.
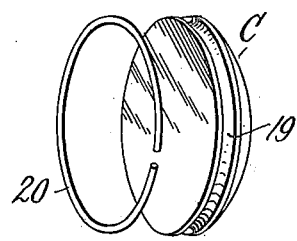
Fig. 9.
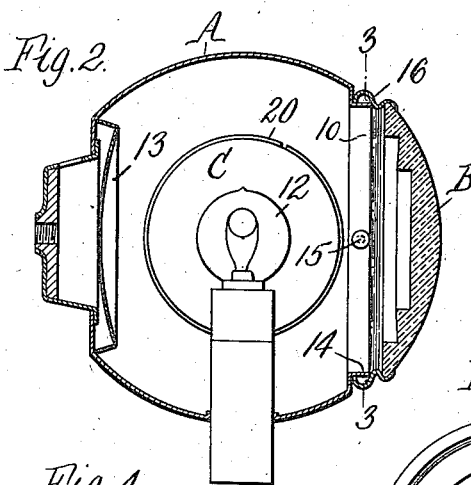
Fig. 2.
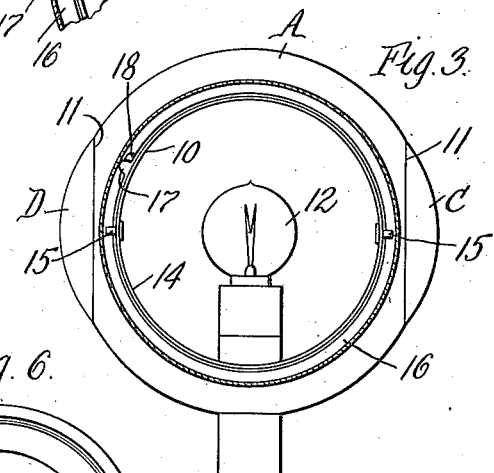
Fig. 3.
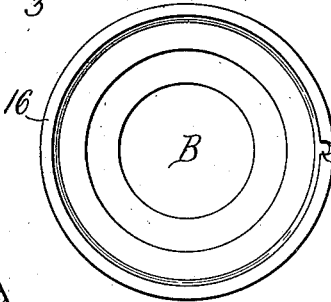
Fig. 6.
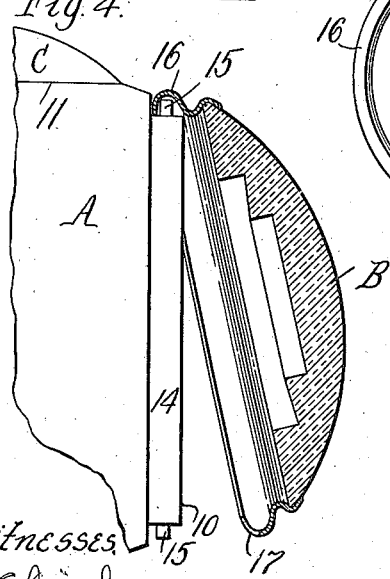
Fig. 4.
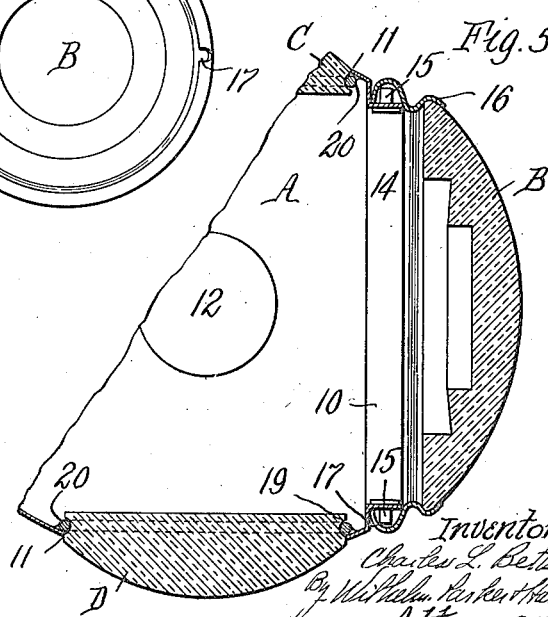
Fig. 5.
Witnesses
A. G. Dimond.
C. H. Bund.
Inventor.
Charles L. Betts,
By Wilhelm Parker Hand
Attorneys.

UNITED STATES PATENT OFFICE.

CHARLES L. BETTS, OF NEW YORK, N. Y., ASSIGNOR TO R. E. DIETZ COMPANY, OF NEW YORK, N. Y.

LAMP.

1,041,414.     Specification of Letters Patent.    Patented Oct. 15, 1912.

Application filed January 21, 1910. Serial No. 539,374.

*To all whom it may concern:*

Be it known that I, CHARLES L. BETTS, a citizen of the United States, residing at New York, borough of Brooklyn, in the county of Kings and State of New York, have invented a new and useful Improvement in Lamps, of which the following is a specification.

This invention relates to that class of lamps in which the case or body is provided with lenses through which the light is emitted and has particular reference to tail lamps for automobiles and other vehicles, in which class of lamps the case or body is usually provided on its rear side with a ruby semaphore lens, through which a red light is displayed rearwardly, and on its sides with a white and a green bull's eye lens.

The object of this invention is to provide simple, convenient and reliable means for securing these lenses to the body or case of the lamp.

In the accompanying drawings: Figure 1 is a side elevation of an electric tail lamp embodying this invention. Fig. 2 is a longitudinal sectional elevation thereof, on an enlarged scale. Fig. 3 is a transverse sectional elevation at right angles to Fig. 2, in line 3—3, Fig. 2. Fig. 4 is a horizontal sectional view illustrating the manner of applying the rear lens to the body or case of the lamp. Fig. 5 is a similar view showing the rear lens applied to the body or case.
Fig. 6 is a front elevation of the rear lens. Figs. 7 and 8 are fragmentary sectional views illustrating different positions of the notch and stop of the rear lens. Fig. 9 is a perspective view of one of the side lenses and its attaching rim.

Like reference characters refer to like parts in the several figures.

A represents the body or case of the lamp which may be of any suitable construction or form and is provided in its rear side with a circular upright opening 10 for the rear lens B, which is usually a ruby semaphore lens, and in its sides with circular upright openings 11 for the side lenses or bull's eyes C and D, one of which is usually white and the other green. The case or body A is shown of approximately globular or spherical form, which form is well adapted for an electric lamp, but may be of any other form and construction suitable for the kind of lamps employed, whether an electric or an oil burning lamp.

12 represents an electric lamp secured in the lamp case, and 13 a reflector arranged within the case in front of the lamp so as to reflect the light upon the rear lens B.

The rear opening 10 is formed by a short collar 14 which projects rearwardly and is provided on opposite sides with laterally projecting attaching studs 15. The rear lens B is mounted in an annular attaching frame 16 which fits around the collar 14 and is curved inwardly at its free or front end so as to enter the space between the studs and the body or case of the lamp and engage the studs. This curved or hooked form of the attaching frame forms a circumferential internal cavity or recess in the frame into which the studs project when the frame is in position on the lamp case and in which the studs are concealed. The attaching frame of the rear lens is provided in its edge with a notch 17 which permits the frame to be passed over one of the studs.
This frame is engaged with the studs by first placing the rear lens and its frame in an oblique position, as represented in Fig. 4, and engaging the hooked or hollow frame 16 over one of the studs, then swinging the frame and lens to the normal position, at right angles to the axis of the case, with the notch 17 in line with the other stud, Fig. 5, and then giving the frame and lens a partial turn to break the coincidence between the notch and stud, Fig. 3.

The frame 16 is preferably provided in its cavity with a stop 18 adjacent to the notch 17 which limits the rotary movement of the lens and frame on the body. This stop arrests the turning movement in the locking direction before the notch can register with the stud toward which it is moving, Fig. 7, in which position of the parts the notch is farthest from the stud with which it was engaged in applying the lens to the case. The stop arrests the movement of the lens in the unlocking direction when the notch has reached the position in which it coincides with the stud toward which it has been moving, Fig. 8. The stop, therefore, enables the lens to be readily turned into the locked or unlocked position, without requiring special attention on the part of the user.

The rear lens being detachable from the case, as described, the interior of the case is fully and freely accessible for cleaning, replacing, or manipulating the internal parts of the lamp. The described means for connecting the lens with the case is extremely simple, durable, reliable and convenient.

The side lenses are permanently secured to the case or body and are each provided with a circumferential annular groove 19 in which is arranged a split ring 20 which projects beyond the circumference of the lens and forms a projecting rim on the same. The side opening in which the lens is secured is of the proper diameter to receive the lens and smaller in diameter than this rim. The latter bears against the inner side of the case around the opening, Fig. 4, and is secured to the case by solder or other suitable means.

I claim as my invention:

1. The combination with a lamp case having a circular lens opening and provided outside of said opening with attaching projections which project outwardly therefrom on opposite sides thereof, of a detachable lens frame having a circumferential internal recess adapted to engage over and interlock with said projections and provided in its edge with a notch for engaging it with one of said projections preparatory to rotating the frame to the locked position, substantially as set forth.

2. The combination with a lamp case having a circular lens opening and provided outside of said opening with attaching projections which project outwardly therefrom on opposite sides thereof, of a detachable lens frame having a circumferential internal recess adapted to engage over and interlock with said projections and provided in its edge with a notch for engaging it with one of said projections preparatory to rotating the frame to the locked position and with a stop adjacent to said notch for limiting the rotary movement of the frame, substantially as set forth.

Witness my hand in the presence of two subscribing witnesses.

CHARLES L. BETTS.

Witnesses:
E. D. PRICE,
FRED H. TWOMBLY.